United States Patent [19]

Liu

[11] Patent Number: 4,909,579

[45] Date of Patent: Mar. 20, 1990

[54] CASING FOR CONSOLE (CPU) OF PERSONAL COMPUTER WITH EASY OPENING AND LOCKING MEANS

[75] Inventor: Morgan C. Liu, Taoyuan, Taiwan

[73] Assignee: Enlight Corporation, Taoyuan, Taiwan

[21] Appl. No.: 264,322

[22] Filed: Oct. 28, 1988

[51] Int. Cl.⁴ .............................................. A47B 21/00
[52] U.S. Cl. .................................... 312/208; 312/290; 220/331
[58] Field of Search ................ 220/331; 312/290, 282, 312/208

[56] References Cited

U.S. PATENT DOCUMENTS

| | | | |
|---|---|---|---|
| 131,748 | 10/1872 | Fowler | 220/351 |
| 2,661,015 | 12/1953 | Allred et al. | 312/282 X |
| 3,422,988 | 1/1969 | La Franca | 220/331 X |
| 4,048,050 | 9/1977 | Hillman | 220/331 X |
| 4,119,240 | 10/1978 | Dumas et al. | 220/331 |
| 4,238,049 | 12/1980 | Lehmann et al. | 220/331 |
| 4,741,433 | 5/1988 | Irvine | 220/331 X |

Primary Examiner—Joseph Falk
Attorney, Agent, or Firm—Cushman, Darby & Cushman

[57] ABSTRACT

A casing for the console (Central Processing Unit) of a personal computer with easy opening and locking means consisting of a cover body and a base wherein the cover body is provided with a plurality of locking plates on the bottom portion at both sides and the front end of the top portion. The ends of both sides of the cover body are each pivoted to the end of a slide rod. Both sides of the base are each provided with a plurality of recesses. The top portion of the face extending up vertically from the front end of the base is provided with protruded upper edges, and the back portion of both sides is provided with a plurality of locating members so that the slide rods can be slidably connected to the base. In the present invention, locking is effected by having the locking plates of the cover body engaged with the upper edges and the recesses of the base and, after the locking plates disengaging the upper edges and the recesses, the cover body can be pivoted to open with the ends of the slide rods as the center of rotation such that servicing job of the computer is facilitated and the cover body is closely fitted to the base without the risk of magnetic leakage.

1 Claim, 5 Drawing Sheets 4,909,579

CASING FOR CONSOLE (CPU) OF PERSONAL COMPUTER WITH EASY OPENING AND LOCKING MEANS

FIELD OF THE INVENTION

The present invention relates to a casing for the console (CPU) of a personal computer with easy opening and locking means wherein by means of horizontal sliding movement of the cover body, the cover body and the base of the casing can be engaged and disengaged and, after disengagement, the cover body can be pivoted to open it.

BACKGROUND OF THE INVENTION

Since personal computers have been commercially introduced, due to their compactness, diversified applications, and because their prices are acceptable by the public, they have become popular among individuals, families, firms, and the like. Conventionally, in assembling the casing of the computer system unit, it is assembled by means of screws, making opening of the casing rather troublesome and time-consuming when servicing of the computer is required. For example, there is shown in FIG. 5 a conventional computer casing comprising an upper box 51 and a bottom fox 52 assembled in such a way that the lower edges 53 of the upper box 51 are pushed to be embedded along the recesses 54 of the bottom box and then screws 55 are threaded through the holes 57 on the bottom box 52 to be locked into the threaded holes 56 on the upper box 51. In this case, five screws have to be screwed-in and screwed-out in order to open and close the upper box body, which is time-consuming.

SUMMARY OF THE INVENTION

To overcome the above problems inherent in the conventional casing of the computer console, the present invention tkes advantage of the slidable embedding structure of the locking plates and recesses on the cover body and on the side edges of the base for a good seal such that no magnetic leakage will result so as to enable the present invention to pass the test for electrical magnetic interference as required by the U.S. Federal Communication Commission. Because this type of assembling is rather simple without the use of screws, considerable time for assembling and disassembling can be saved. In the present invention, slide rods and pivot members are provided on both side edges at the bottom of the cover body which, in combination with the locating members on the base, effect parallel sliding and pivotal opening movement such that opening of the cover body for servicing is made very simple.

It can be seen from the foregoing, the main object of the present invention is to provide a casing for the console (CPU) of a personal computer, which takes advantage of the provision of the slide rods, pivot members and locking plates to mate with the locating member-and-recess-structure of the base such that the cover body can be locked in a horizontally sliding manner and pivoted to open after sliding to unlock so that opening the casing for servicing the computer console is both simple and convenient.

In general, in the casing for the console of a personal computer with easy opening and locking means of the present invention, a plurality of inverted U-shaped locking plates are symmetrically disposed of both side edges at the bottom of the cover body, and a slide rod with guide slots is pivoted to the rear end of either side of the cover body by means of pivot members. In addition, both vertical side edges of the base are provided with recesses which are engaged with the locking plates on both side edges at the bottom of the cover body, the front ends of the recesses being formed with projections and embedding grooves. Locating pieces are provided in the rear of the vertical side edges on both sides of the base to fit with the guide slots of the slide rods, allowing such that the slide rods to be slid within the range limited by the guide slots with the support of the locking pieces.

Locking of the cover body and base is effected by engaging the locking plates of the cover body into the recesses of the base and pushing the locking plates into the grooves of the recesses so that the cover body is locked to the base. To open the cover body, the locating plates of the cover body are pushed horizontally away from the grooves of the recesses and then the cover body is rotated to open with the pivot members on the ends of the slide rods as the center of rotation so that the cover body rests on a table and allows servicing of the computer console.

DETAILED DESCRIPTION OF THE PREFERRED EMBODIMENT

Figure 1:
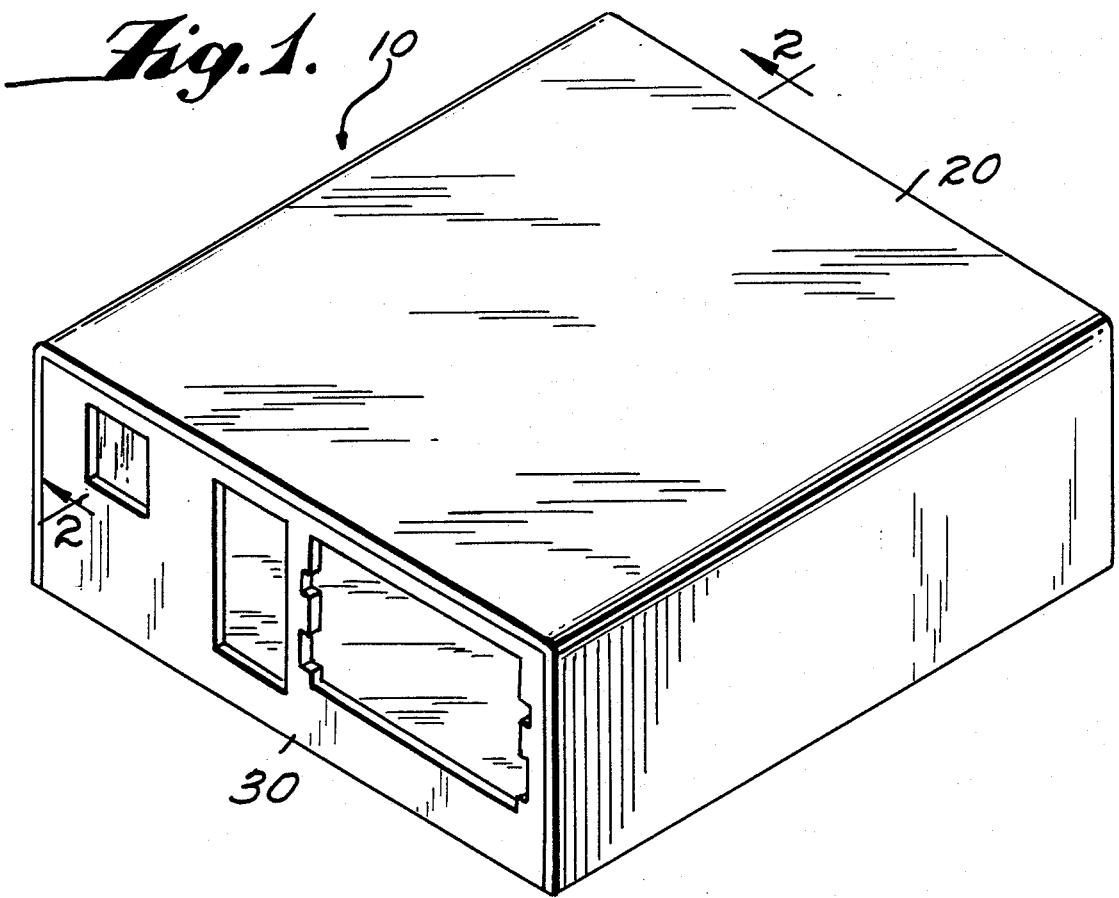
FIG. 1 is a perspective view of the cover body and the base of the casing according to the present invention in assembled condition.
Figure 4:
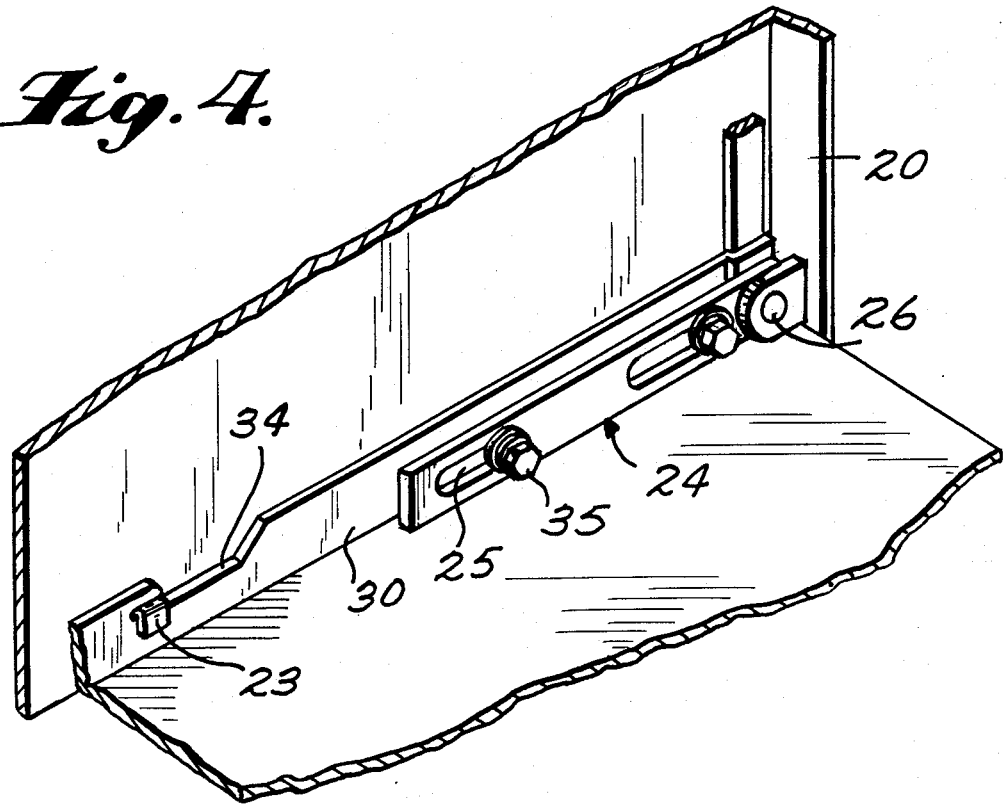
FIG. 4 is an enlarged fragmentary perspective view showing that when the cover body and the base are fitted, the locking plates and the slide rod on one side of the bottom of the cover body and the recesses and the locating members on both sides of the base are fitted relative to each other and that the cover body is pivotally secured to the pivot members on the ends of the slide rods.

The present invention will now be described in detail with reference to the accompanying drawings for a better understanding of the structural and functional features of the present invention.

Referring to FIGS. 1 to 4, there is shown a casing 10 for a computer console comprising a cover body 20 and a base 30 in which a plurality of inverted U-shaped locking plates 23 are provided symmetrically on both sides at the bottom of the cover body 20 (locking plates 23 can be secured to the inner face of the cover body 20 by means such as welding) and a plurality of locking plates 22 are provided on the front end at the top 211 of the cover body 20, their grooves 21 adopted to be engaged with the upper edges 31 on the top face 311 extending up vertically from the front end of the base 30, the rear ends on both sides at the bottom of the cover body 20 being each pivotally connected to the end of a slide rod 24 by means of a pivot member 26 such as a screw, and said slide rod 24 being provided with a pair of guide grooves 25 of the same size.

In addition, a plurality of recesses 34 which mate with the inverted U-shaped locking plates 23 of the cover body 20 are provided symmetrically at the edges on both sides of the base 20. The front end of each of the recesses 34 is formed with a projection 32 and an embedding groove 33 such that the embedding groove 33 is capable of receiving an inverted U-shaped locking plate 23 to be locked therein. The rear ends on both sides of the base 30 are each provided with a pair of locating members 35 (such as a combination of screws and washers) which mate with the guide grooves 25 of the slide rods 24 such that the slide rods 24 are supported on the locating members 35 and are slidably moveable within the range limited by the guide slots 25.

Figure 2:
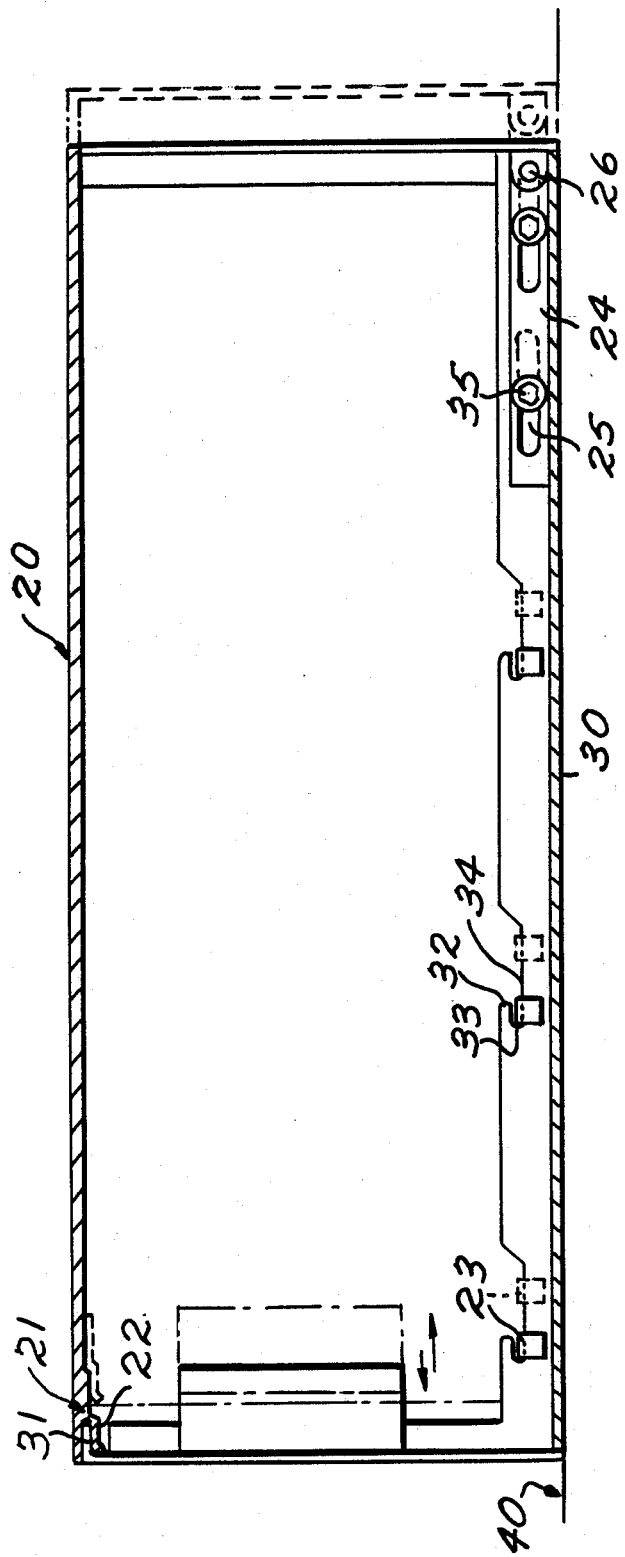
FIG. 2 is a cross section view taken along line II-II of FIG. 1 in which the locking plates on both sides at the bottom of the cover body have been moved into the groove position of the recesses on both sides at the bottom of the base.

The operation of the present invention will now be described hereinafter:

The locking plates 22, 23 and the slide rods 24 are secured to the cover body 20 so that when the cover body 20 is slid forward horizontally to be locked on the base 30, the locking plates 22, 23 and the slide rods 24 are all moved forward, that is, the grooves 21 of the locking plates 22 engage with the upper edge 31 of the base 30, the locking plates 23 are embedded into the grooves 33 of the recesses 34, and the slide rods 24 are also moved forward but the moving distance is limited by the guide grooves 25 so that the slide rods are stopped by the locating members 35 (see FIG. 2).

Figure 3:
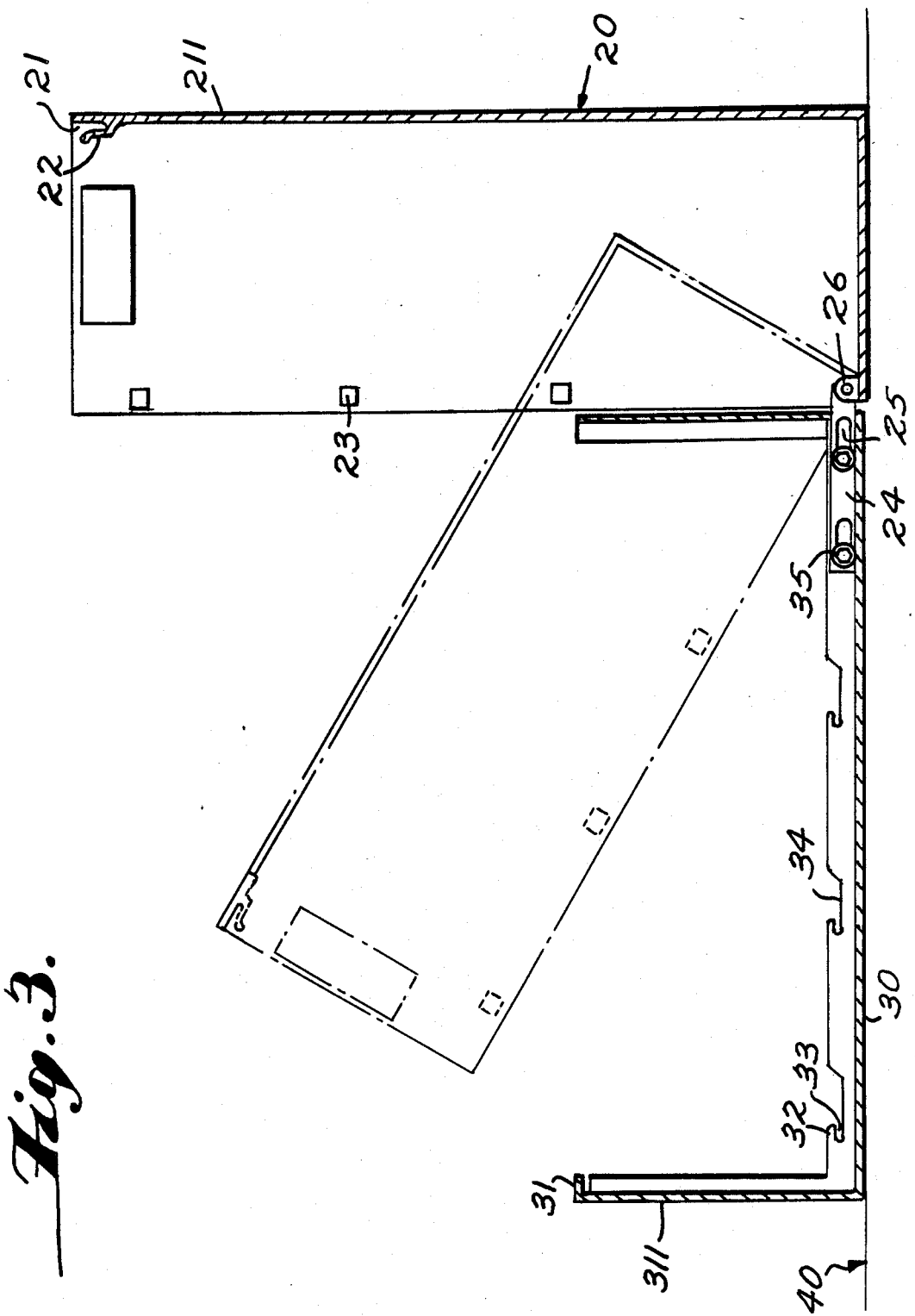
FIG. 3 is an elevational view showing that the cover body is opened and rests on a table after having been disengaged from the base and included is an imaginary elevation view showing that the cover body is rotated to open by using the pivot members on the ends of the slide rods as the center of rotation.
Figure 5:
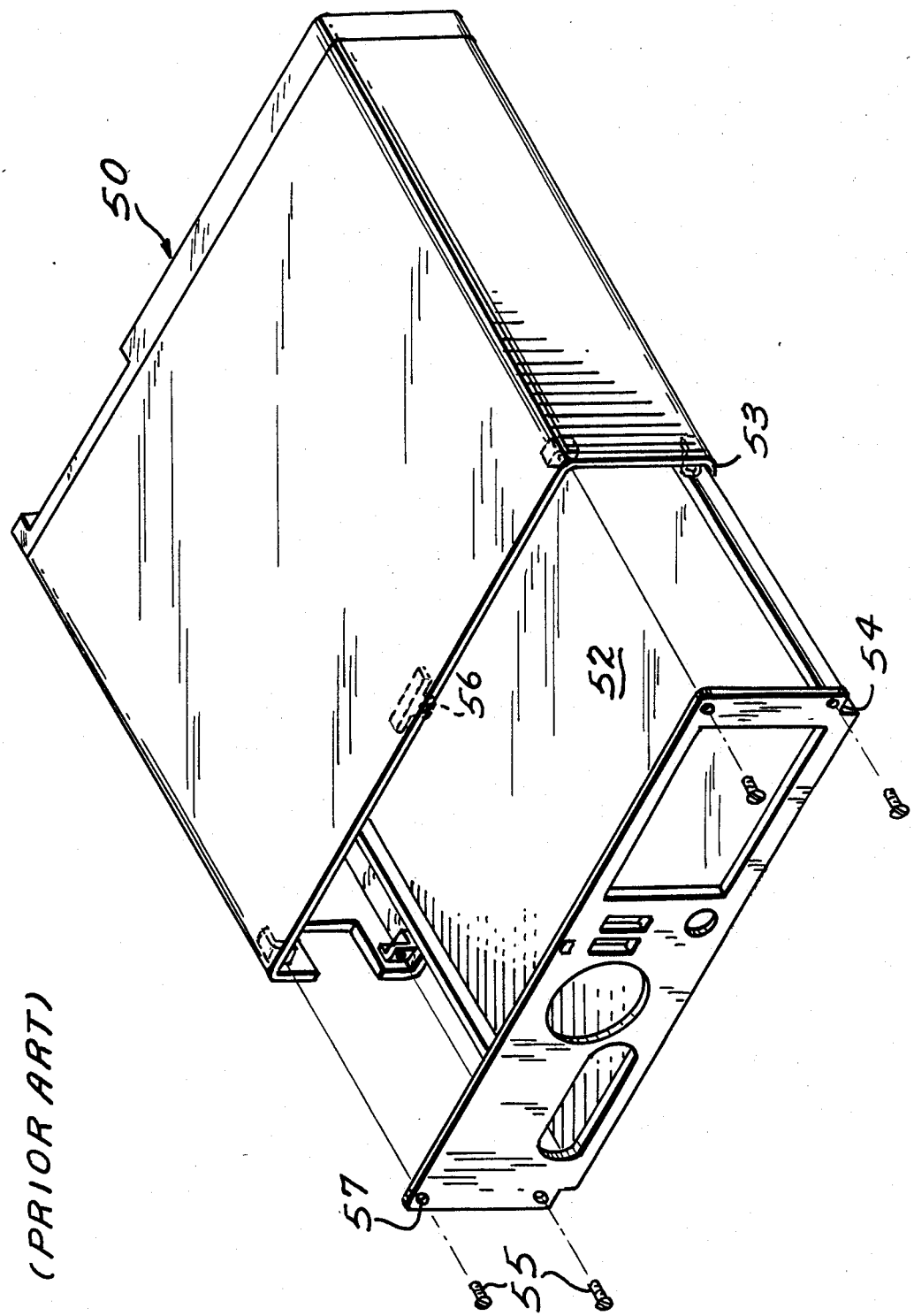
FIG. 5 (marked "Prior Art") is a schematic view showing a conventional casing for the computer console in an assembled condition.

To open the cover body 20, it is moved back horizontally such that the embedding grooves 21 disengage from the upper edge 31 and the locating plates 23 are moved away from the position of the grooves 33 but stopped by the locating members 35 so as to limit the moving distance, then the cover body 20 is moved up such that the cover body 20 is rotated to open using the pivot members 26 as the center of rotation and brought to rest on a table (40) (see FIG. 3).

From the foregoing description of the structure and the operation of the casing for the personal computer console with simple, easy opening locking means according to the present invention, it can be seen that the present invention provides a console casing which is convenient to open and lock and facilities the servicing of the computer console. It is understood that the above-mentioned embodiment should not be construed as limiting the scope of the present invention. All the changes and modifications that can be made to the present invention are within the scope thereof which is defined by the appended claims.

I claim:

1. A casing for a computer console with simple and easy-opening locking means comprising:
   a cover body having two sides, an outside of a lower end of each of said sides being provided symmetrically with a plurality of inverted U-shaped locking plates and a front end of said cover body being provided with a plurality of locking plates which extend outwardly and form a plurality of first grooves with a top surface of said cover body;
   a base having a vertically-extending surface on a front end thereof and an edge extending inwardly from a top of said vertically extending surface for engaging with said first grooves of said cover body, said base further comprising a plurality of recesses on two sides thereof; the positions of said recesses corresponding to those of said inverted U-shaped locking plates of said cover body so that the recesses can mate with the locking plates when the cover body is lowered upon the base; each of said recesses comprising a projection on a front thereof which forms a second groove with a bottom of said recess and is constructed so that said locking plates of said cover body can engage with said second groove;
   wherein said base further comprises a pair of longitudinal sliding rods disposed horizontally and symmetrically on both sides of a rear end thereof, each of which is pivotally connected to said cover body by means of a pivot member, said longitudinal sliding rods and said guide grooves permitting said cover body to move horizontally toward said front end of the base when said cover body is placed upon said base; each of said sliding rods having an appropriate number of guide grooves and each of said guide grooves being inserted by a locating member; said locating member having a diameter of a lower portion thereof which is smaller than a radial space of said guide grooves and a diameter of an upper portion thereof being larger than the radial space of said guide groove such that the sliding rods can move between the distance limited by a length of the guide groove with the relative movement of said cover body and said base; when the cover body reaches the most front end of the guide grooves, said locking plates and said inverted U-shaped locking plates of the cover body are engaged with said second grooves of the recesses and said extending edges on the vertically-extending surface of the base so as to complete the casing's locking operation.

* * * * *